(12) United States Patent
Klinger

(10) Patent No.: US 7,250,872 B2
(45) Date of Patent: Jul. 31, 2007

(54) METHOD AND DEVICE FOR TESTING AT LEAST ONE LED STRIP

(75) Inventor: Jürgen Klinger, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 251 days.

(21) Appl. No.: 11/119,946

(22) Filed: May 2, 2005

(65) Prior Publication Data

US 2005/0242822 A1 Nov. 3, 2005

(30) Foreign Application Priority Data

Apr. 30, 2004 (DE) ...................... 10 2004 021 320
Jun. 7, 2004 (DE) ...................... 10 2004 027 676

(51) Int. Cl.
  *G08B 21/00* (2006.01)
(52) U.S. Cl. ...................... 340/642; 340/458; 324/523
(58) Field of Classification Search ................ 340/642, 340/435, 479, 458, 468, 641, 644; 324/523, 324/767
  See application file for complete search history.

(56) References Cited

U.S. PATENT DOCUMENTS

| | | | | |
|---|---|---|---|---|
| 3,688,255 A | * | 8/1972 | Klein et al. ................ | 340/452 |
| 3,840,852 A | * | 10/1974 | Schwellenbach ............ | 340/458 |
| 4,447,806 A | * | 5/1984 | Gundel et al. .............. | 340/641 |
| 6,218,952 B1 | * | 4/2001 | Borland et al. ............. | 340/641 |
| 2001/0054955 A1 | | 12/2001 | Diez .......................... | 340/435 |

FOREIGN PATENT DOCUMENTS

| | | |
|---|---|---|
| DE | 198 10 512 A1 | 9/1999 |
| DE | 199 05 709 A1 | 8/2000 |
| DE | 200 11 115 U1 | 10/2000 |
| DE | 199 47 301 C1 | 7/2001 |
| DE | 101 31 824 A1 | 2/2003 |

* cited by examiner

*Primary Examiner*—Phung T. Nguyen
(74) *Attorney, Agent, or Firm*—Laurence A. Greenberg; Werner H. Stemer; Ralph E. Locher

(57) ABSTRACT

A test device for at least one LED strip contains: a voltage source, by way of which a cold test voltage or a warm test voltage can be applied to a parallel circuit formed of a test resistor and the LED strip, and an evaluation unit which records the cold test current flowing when a cold test voltage is present and diagnoses an error if the cold test current deviates from a required value by an above-the-threshold amount. A test device contains a switching element connected in series with the test resistor and an error circuit connected to the at least one LED strip, which during the warm testing records an over-the-threshold deviation of a current flowing through the at least one LED strip from a pre-specified value and for an over-the-threshold deviation opens the switching element.

12 Claims, 2 Drawing Sheets

METHOD AND DEVICE FOR TESTING AT LEAST ONE LED STRIP

BACKGROUND OF THE INVENTION

Field of the Invention

The invention relates to a method and a device for testing at least one LED strip.

In motor vehicles incandescent bulbs are increasingly being replaced by fields or arrays of light-emitting diodes (LEDs). These fields usually consist of a number of parallel strips, each with a number of diodes that are connected electrically in series.

For traffic safety reasons it is necessary to test light sources of motor vehicles, especially rear lights and turn signal indicators, to enable a malfunction to be detected immediately.

A method is known from German published patent application DE 199 05 709 A1 for detecting a lamp failure, in which current and voltage of a lamp circuit are measured and the measured values are compared to stored reference values. If the measured values differ from the stored reference values by more than a threshold value, an error signal is generated.

A monitoring device, especially for signal lights of motor vehicles, is known from German utility model (Gebrauchsmuster) DE 200 11 115 U1, in which an electronic switch is provided with which an emergency path to the signal light can be released by its control if an error occurs.

German published patent application DE 198 10 512 A1 describes a method and a device for generating an error signal in which errors in a stop light circuit are detected. In this case the stop light, if no brake pedal was operated, is activated for a prespecified period with a current strength which does not lead to the brake light coming on. During this period the current and/or voltage drop is recorded and, on deviation above a threshold from the required value, is detected as an error.

FIG. 4 shows a diode field which for example forms a brake light of a motor vehicle, with a prior art test device. A battery 10 is connected via an electronic switching device 12 and a supply lead 14 is connected to an LED module 16. The LED module 16 contains a diode 18 to protect against polarity reversal and a plurality of parallel-connected LED strips $20_1$–$20_n$, which each contain a resistance element $20_1$–$20_n$ with which differences in luminous intensity caused by tolerances of the individual LEDs are balanced out. In parallel to the LED strips 20 there is a test resistor 24.

The electronic switching device 12 has at least one input 26 which changes its signal state when a brake switch is actuated for example, whereafter the electrical switching device 12 connects the battery 10 at low-resistance to the LED module 16 so that the individual LEDs light.

Controlled by an internal program or a further input, the electronic switching device 12 establishes a high-resistance connection between the battery 10 and the LED module when the brake pedal is not pressed, with the voltage present at the individual LED strips not being sufficient for through switching the LEDs (cold test), so that the LEDs do not light. Despite this, a predetermined current flows through the switching device 12 as a result of the test resistor 24, the strength of which is recorded in the electronic switching device 12, with an error signal being created if this current varies from a required current by more than a specified value. A downward variation indicates a failure of the supply lead 14, for example a break in the lead.

It is easily possible to measure the current flowing (heat test, warm test) when the brake is actuated, i.e. the switching device is through connected and the light-emitting diodes are thus lighting normally and to deduce a possible error in the light emitting diodes from this. If for example five LED strings are present and one LED strip fails, the current flowing in this case lies around 20% below the required current, which flows when the LED module is in order. This 20% deviation however, because of the heavy temperature dependence of the resistor of the LEDs and where necessary further influencing factors does not allow any firm conclusion to be drawn about the failure of an LED strip. One option for detecting the failure of an LED strip would be to record the currents or the voltage drops at the resistance elements 22 or the downstream LED strips and evaluate the differences between them. This would however require at least one further line to connect the LED module to the electronic switching and evaluation device.

German published patent application DE 101 31 824 A1 describes a switching device for detecting failures of LEDs in motor vehicles in which one test resistor is connected in series in each case with an LED strip and the current flowing through the LED strip is compared to a reference value. There is no provision for performing a warm test and a cold test.

SUMMARY OF THE INVENTION

It is accordingly an object of the invention to provide a method and a device for testing one or more LED strips which overcome the above-mentioned disadvantages of the heretofore-known devices and methods of this general type and which enables diagnosing an error in the LED module, which does not require a further supply lead or connecting lead between the LED module and the electronic switching or evaluation unit.

With the foregoing and other objects in view there is provided, in accordance with the invention, a method for testing an LED strip, which comprises:

carrying out a warm test by applying to the LED strip and a test resistor connected in parallel thereto, a warm test voltage above a breakthrough voltage of the LED strip;

during the warm test, checking whether or not a current flowing through the LED strip exceeds a pre-specified threshold value;

if the current exceeds the threshold value, opening a switching element connected in series with the test resistor;

with the switching element open, carrying out a cold test by applying to the LED strip and the test resistor a cold test voltage below the breakthrough voltage of the LED strip; and diagnosing an error if a resulting cold test current deviates from a required value by more than a specified value.

With the method in accordance with the invention, for a fault in an LED module of the electronic switching and evaluation unit the absence of the test resistor is simulated so that with the so-called cold test in which a voltage is merely applied to the LED module, which does not lead to the LEDs lighting an error is signaled.

In accordance with an added feature of the invention, the cold test is conducted before the warm test.

In accordance with an additional feature of the invention, a number of LED strips with approximately a same breakthrough voltage are provided in parallel to the test resistor, and checking, during the warm test, whether current through the LED strips exceeds specified threshold values.

With the above and other objects in view there is also provided, in accordance with the invention, a device for testing at least one LED strip, comprising:

a test resistor connected in parallel to the at least one LED strip;

a test voltage source for selectively applying to the test resistor and the LED strip a cold test voltage below the breakthrough resistance of the LED strip or a warm test voltage above the breakthrough resistance;

an evaluation unit connected to record a cold test current flowing when a cold test is performed and to diagnose an error if the cold test current exceeds a given threshold by a required value;

a test device having a switching element connected in series with the test resistor and an error circuit connected to the at least one LED strip, the error circuit detecting a deviation above a given threshold of a current flowing through the at least one LED strip from a pre-specified value during a warm test, and opening the switching element in a case of an above-the threshold deviation, to enable the evaluation unit to diagnose an error when, subsequent to the warm test voltage, a cold test voltage is present at the parallel circuit comprising the test resistor and the at least one LED strip.

In accordance with another feature of the invention, a supplementary energy source to be charged for the warm test voltage is present at the parallel circuit formed of the test resistor and the LED strip, and wherein an energy of the supplementary energy source causes the switching element to be opened in an event of a fault and to be held open as long as the energy in the supplementary energy source lies above a pre-specified value.

In accordance with a further feature of the invention, the test voltage source and the evaluation unit belong to a programmable switching and evaluation unit.

In accordance with again an added feature of the invention, the supplementary energy source is a capacitor to which the warm test voltage is applied.

In accordance with again an additional feature of the invention, the switching element is closed when a capacitor voltage of the capacitor drops below a pre-specified value.

In accordance with again another feature of the invention, a plurality of LED strips are connected in parallel to one another and the error circuit is configured to record an over-the-threshold deviation of voltage drops at the LED strips and from specific required values as errors.

In accordance with again a further feature of the invention, the LED strips are substantially identical LED strips and the error circuit (28) is configured to record an above-the threshold deviation between the voltage drops at the LED strips as errors.

In accordance with yet another feature of the invention, a series circuit comprising the measurement resistor and a parallel circuit comprising a number of LED strips is connected in parallel to the test resistor and the error circuit is configured to record a voltage drop at the measurement resistor and a voltage drop at least one of the LED strips.

In accordance with a concomitant feature of the invention, there are provided a plurality of modules each with a plurality of LED strips and a test device, and the test voltage source is connected to a parallel circuit of the test resistor and test switches of the test devices connected in series downstream of the test resistor and the series-connected LED strips of each the module.

Other features which are considered as characteristic for the invention are set forth in the appended claims.

Although the invention is illustrated and described herein as embodied in a method and device for testing at least one LED strip, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
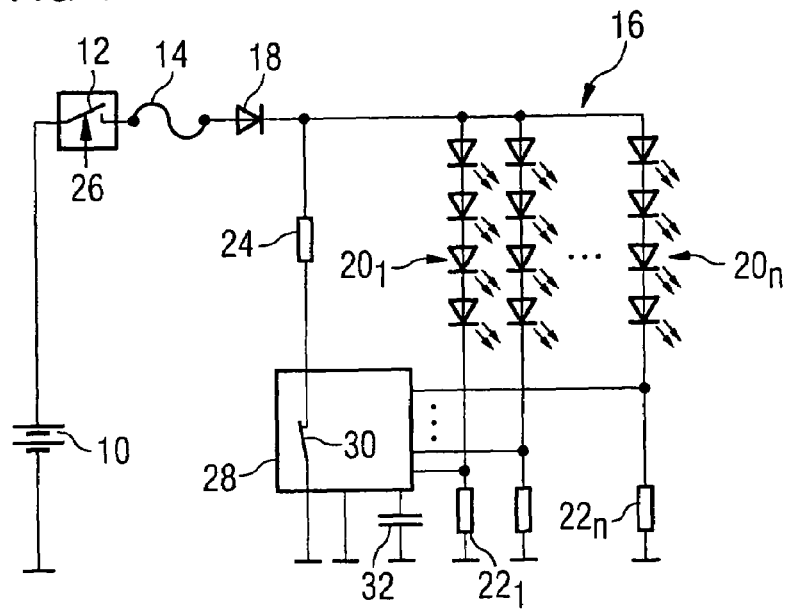
FIG. 1 is a block circuit diagram of a first embodiment of the device according to the invention.
Figure 4:
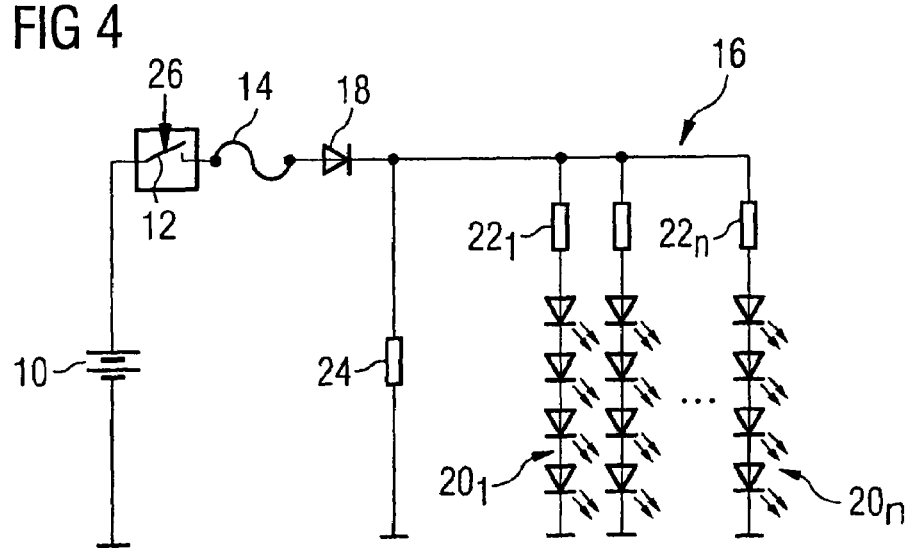
FIG. 4 is a diagram of a prior art circuit for supplying power to and testing a diode module.

Referring now once more to the figures of the drawing in detail and first, particularly, to FIG. 1 thereof, there is shown a circuit according to the invention. The circuit of FIG. 1 differs from that shown in FIG. 4 in that a test device 28 is provided which contains a switching element 30 connected in series with the test resistor 24. The test device 28 is connected via lines in each case with a point in the LED strips such that the voltage drop at their resistance elements $20_1$–$20_n$ can be measured. Furthermore the test device 28 includes a comparison circuit not shown in the diagram and for which the layout is known per se, which for a deviation of the voltage drops between the resistance elements exceeding the thresholds $20_1$–$20_n$ generates an error signal. In addition the test device 28 includes a supplementary energy source 32, a capacitor in the example shown, which is connected for example to the input of the test device 28 leading to the test resistor 24.

The function of the test device 28 in conjunction with the electronic switching and evaluation device 12 is as follows: The switching element 30 is normally closed. When the electronic switching and evaluation device 12, on actuation of the brake, connects the LED module 16 at low-resistance to the battery 10, in the trouble-free state of the LED module the LEDs light and the voltage drops at the resistance elements $20_1$–$20_n$ differ by less than a threshold value.

If one of the LED strips fails, there is no voltage drop at the associated resistance element. If an LED shorts out a voltage drop, which is too great occurs. For a fault the voltage drops at the resistance elements $20_1$–$20_n$ thus differ in the amount by which they exceed the threshold. This is evaluated as an error by the test device 28, at which point the switching element 30 of the supplementary power source 32, which is charged as soon as a voltage is applied to the LED module, is opened.

After the actuation of the brake has ended (end of the low-resistance connection of the LED module to the battery 10 or of the warm test) a cold test is run by the switching and evaluation device establishing a high-resistance connection between battery 10 and LED module 16 such that the LEDs do not through-switch. During the cold test the switching element 30 opened with energy from the supplementary energy source 32 initially remains open so that no current flows through the LED module 16 or the electronic switching and evaluation module 12, which is evaluated by the latter as an error. When the energy of the supplementary energy source 32 is no longer sufficient to hold the switching element 30 open, the switching element 30 closes.

As can be seen from this explanation, it is possible with the arrangement in accordance with FIG. 1 to detect a failure of the LED strip, without a line in addition to the line 14 between the LED module 16 and the electronic switching and evaluation unit 12 being necessary.

Figure 2:
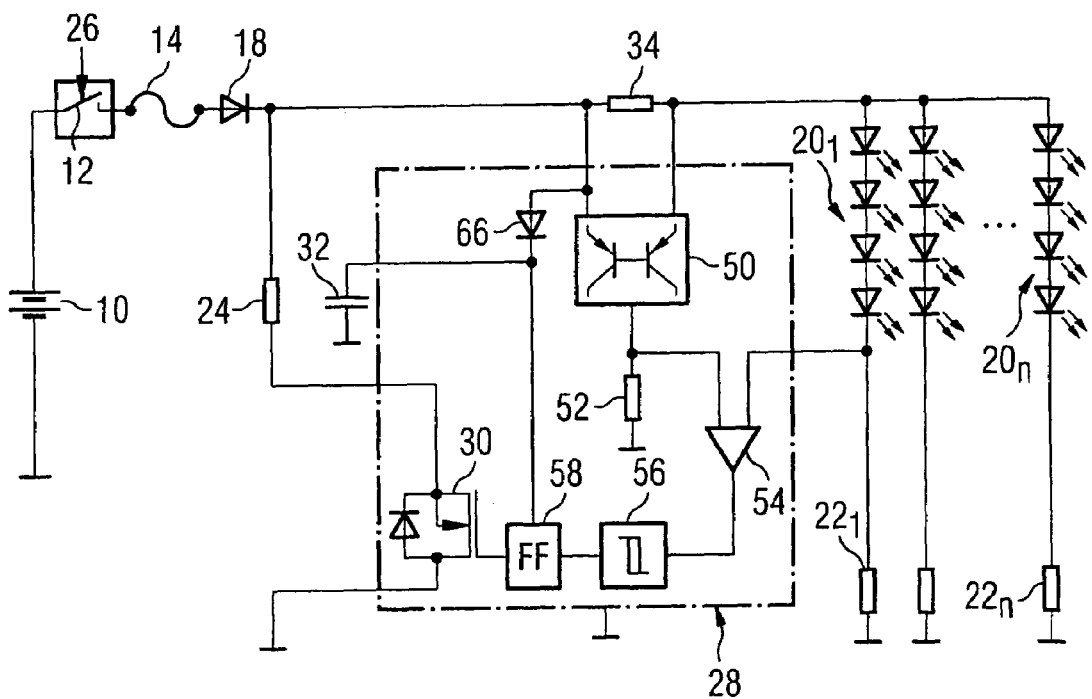
FIG. 2 is a block circuit diagram of a second embodiment of the device according to the invention.

FIG. 2 shows a variation compared to FIG. 1. The variation consists primarily of the LED strips $20_1$–$20_n$ being connected via a measuring resistor 34 through which the entire current flowing through the LED strip flows. The test device 28 records the voltage drop at the measurement resistor 34 and the voltage drop at one of the resistance elements 22. If the ratio of the summation current flowing through the measurement resistor 34 to the strip current flowing through the LED strip deviates by a prespecified value above the threshold, this is evaluated as a fault in at least one of the LED strips.

FIG. 2 is a further exemplary embodiment of the test device according to the invention and illustrated in a block diagram:

A current balancing circuit 50 lying in parallel to measurement resistor 34 converts the current through the measurement resistor 34 into a voltage drop at a current/voltage converter 52. This voltage and the voltage dropping via the resistance element $22_1$ are fed to a difference stage 54. If there is inequality of these two voltages above the threshold a window comparator circuit 56 controls a flip-flop 58 supplied from the supplementary energy source 32 so that this opens the switching element 30. A rectifier element 66 prevents the supplementary energy source 32 being prematurely discharged via the test resistor 24.

The switching element 30 is in this example advantageously embodied as a P-channel depletion type MOSFET.

The switching element 30 could thus be arranged on the supply side above the test resistor 24 and then embodied as an N-channel depletion type MOSFET. The supplementary energy source 32 would then also be connected on the supply side.

Furthermore the measurement resistor 34 could also be arranged on the ground side below the resistance elements 22 and use an inverting amplifier instead of a current balancing circuit.

Figure 3:
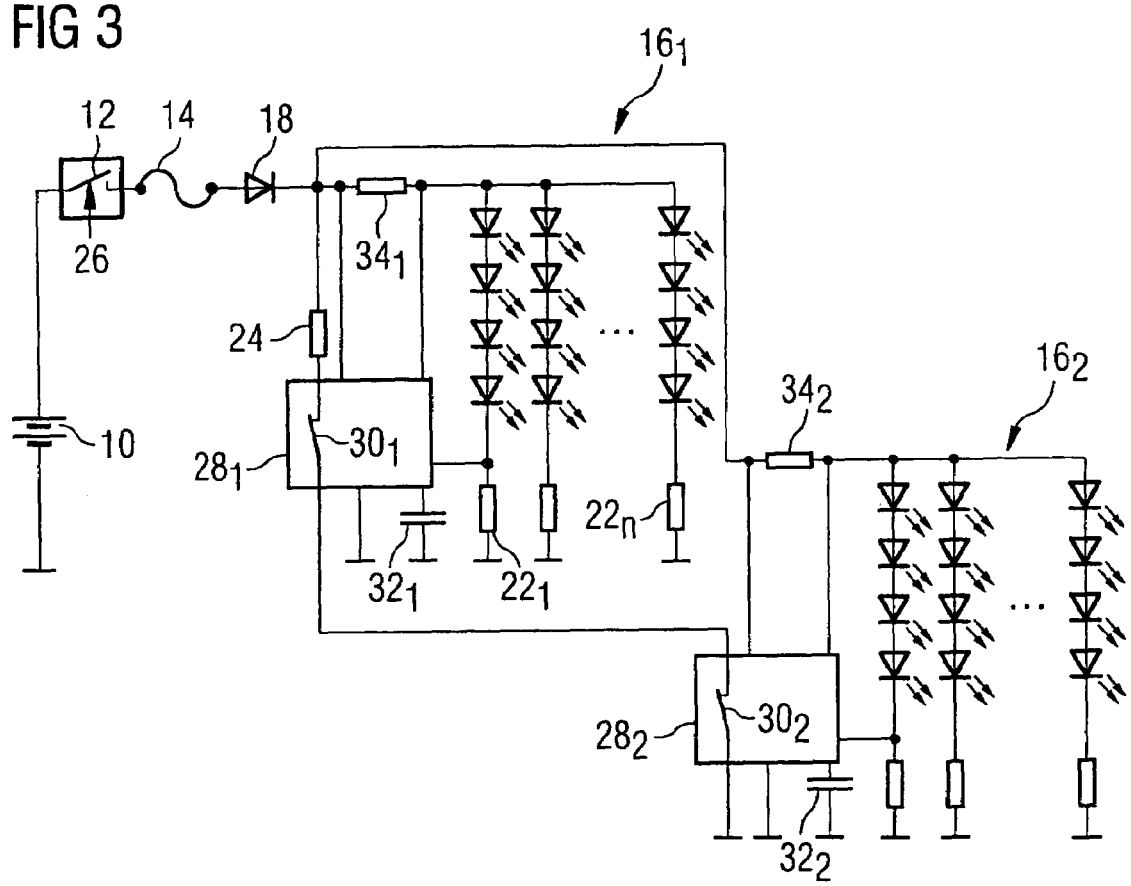
FIG. 3 is a block circuit diagram of a third embodiment of the device according to the invention.

The advantage of the arrangement according to FIG. 2 compared to that of FIG. 3 lies in that fact not every LED strep has to be connected via a separate line up to the test device 28, which requires a great deal of effort, especially in the case of many LED strips and leads to additional expense in the circuit of the test device 28.

FIG. 3 shows an embodiment in which there is provision for a number of arrangements in accordance with FIG. 2. A first LED module $16_1$ with test device $28_1$ is connected to the diode 18 as it is in the arrangement according to FIG. 2 In parallel to this a further LED module $16_2$ with measurement resistor $34_2$ and test device $28_2$ is connected to the diode 18. The switching elements $30_1$ and $30_2$ of the test devices $28_1$ and $28_2$ are connected in series to the test resistor 24. As can be easily seen, in the arrangement in accordance with FIG. 3 in which further LED modules and test devices can be connected in the circuit, a great plurality of LED strips can be monitored, with however only the failure of one of the LEDs strips being detected overall in the electronic switching and evaluation device 12 and the relevant strip not being able to be identified.

The invention can be embodied and modified in numerous ways. For example arrangements in accordance with FIG. 1 can also be connected together in FIG. 3. The layout of the electronic switching and evaluation unit cannot take a number of forms for example through a semiconductor switching element for which the volume resistance can be controlled by means of an appropriate controller. Also the switching element 30 of the test device 28 can be embodied in a wide variety of ways, for example by a semiconductor switch which is opened by the voltage present at capacitor 32 if an error in the associated LED strips is detected. The capacitor or the supplementary energy source is not mandatory since the power for the switching element 30 can also be derived from the supply voltage present during the operational or warm test phase and the switching element 30 can be embodied such that it remains open for a specified period of time (e.g. bimetal element) or permanently (e.g. bistable element). If the power supply for the supplementary energy source 32 depends on the fault status in the LEDs strips the closed duration of the switching element 30 which can be recorded in the electronic switching and evaluation unit 12 can be used to also indicate the type of error. In the exemplary embodiments described the voltage drop in one LEDs strip was measured at the relevant resistance element 22. Naturally the voltage drop can also be measured at the series circuit of the LEDs of a strip. The LED strips do not necessarily have to be the same as each other. The non-similarity can for example be taken into account by nominal values stored in a memory of the electronic switching and evaluation unit. Advantageously the LED strips, their series resistors (which are not mandatory), of the test resistor 24, the test device 28, the capacitor 32 and if necessary the measurement resistor 34 are grouped together on a common chassis unit to form a module. The number of the LED strips can vary, with it also been possible to monitor just one LED strip.

This application claims the priority, under 35 U.S.C. § 119, of German patent applications Nos. 102004021320.8, filed Apr. 30, 2004 and 102004027676.5, filed Jun. 7, 2004; the disclosures of the prior applications are herewith incorporated by reference in their entirety.

I claim:

1. A method for testing an LED strip, which comprises:
carrying out a warm test by applying to the LED strip and a test resistor connected in parallel thereto, a warm test voltage above a breakthrough voltage of the LED strip;
during the warm test, checking whether or not a current flowing through the LED strip exceeds a pre-specified threshold value;
if the current exceeds the threshold value, opening a switching element connected in series with the test resistor;
with the switching element open, carrying out a cold test by applying to the LED strip and the test resistor a cold test voltage below the breakthrough voltage of the LED strip; and
diagnosing an error if a resulting cold test current deviates from a required value by more than a specified value.

2. The method according to claim 1, which comprises conducting the cold test before the warm test.

3. The method according to claim 1, which comprises providing a number of LED strips with approximately a same breakthrough voltage in parallel to the test resistor, and checking, during the warm test, whether current through the LED strips exceeds specified threshold values.

4. A device for testing at least one LED strip, comprising:
a test resistor connected in parallel to the at least one LED strip;

a test voltage source for selectively applying to the test resistor and the LED strip a cold test voltage below the breakthrough resistance of the LED strip or a warm test voltage above the breakthrough resistance;

an evaluation unit connected to record a cold test current flowing when a cold test is performed and to diagnose an error if the cold test current exceeds a given threshold by a required value;

a test device having a switching element connected in series with the test resistor and an error circuit connected to the at least one LED strip, said error circuit detecting a deviation above a given threshold of a current flowing through the at least one LED strip from a pre-specified value during a warm test, and opening said switching element in a case of an above-the threshold deviation, to enable said evaluation unit to diagnose an error when, subsequent to the warm test voltage, a cold test voltage is present at the parallel circuit comprising said test resistor and the at least one LED strip.

5. The device according to claim 4, which further comprises a supplementary energy source to be charged for the warm test voltage present at the parallel circuit formed of said test resistor and the LED strip, and wherein an energy of said supplementary energy source causes said switching element to be opened in an event of a fault and to be held open as long as the energy in the supplementary energy source lies above a pre-specified value.

6. The device according to claim 4, wherein said test voltage source and said evaluation unit belong to a programmable switching and evaluation unit.

7. The device according to claim 4, wherein said supplementary energy source is a capacitor to which the warm test voltage is applied.

8. The device according to claim 7, wherein said switching element is closed when a capacitor voltage of said capacitor drops below a pre-specified value.

9. The device according to claim 4, wherein a plurality of LED strips are connected in parallel to one another and said error circuit is configured to record an over-the-threshold deviation of voltage drops at the LED strips and from specific required values as errors.

10. The device according to claim 9, wherein the LED strips are substantially identical LED strips and said error circuit (28) is configured to record an above-the threshold deviation between the voltage drops at the LED strips as errors.

11. The device according to claim 9, wherein a series circuit comprising said measurement resistor and a parallel circuit comprising a number of LED strips is connected in parallel to said test resistor and said error circuit is configured to record a voltage drop at said measurement resistor and a voltage drop at least one of the LED strips.

12. The device according to claim 4, which comprises a plurality of modules each with a plurality of LED strips and a test device, and wherein said test voltage source is connected to a parallel circuit of said test resistor and test switches of said test devices connected in series downstream of said test resistor and the series-connected LED strips of each said module.

* * * * *